United States Patent
Ofenloch et al.

(10) Patent No.: US 11,423,047 B2
(45) Date of Patent: Aug. 23, 2022

(54) COPY EXECUTION WITHIN A LOCAL DATABASE

(71) Applicant: SAP SE, Walldorf (DE)

(72) Inventors: Dominik Ofenloch, Lampertheim (DE); Thomas Vogt, Neustadt a.d.W. (DE)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 16/871,251

(22) Filed: May 11, 2020

(65) Prior Publication Data

US 2021/0349916 A1    Nov. 11, 2021

(51) Int. Cl.
| | |
|---|---|
| *G06F 16/27* | (2019.01) |
| *G06F 16/22* | (2019.01) |
| *G06F 16/16* | (2019.01) |
| *G06F 16/28* | (2019.01) |
| *G06F 16/23* | (2019.01) |
| *G06F 16/2457* | (2019.01) |

(52) U.S. Cl.
CPC ............ *G06F 16/27* (2019.01); *G06F 16/162* (2019.01); *G06F 16/2282* (2019.01); *G06F 16/2322* (2019.01); *G06F 16/24573* (2019.01); *G06F 16/284* (2019.01)

(58) Field of Classification Search
CPC ...................................................... G06F 16/27
USPC ........................................................ 707/609
See application file for complete search history.

(56) References Cited

U.S. PATENT DOCUMENTS

| | | | |
|---|---|---|---|
| 6,772,163 B1 * | 8/2004 | Sinclair | ................ G06F 16/284 |
| 7,031,787 B2 | 4/2006 | Kalthoff et al. | |
| 7,133,878 B2 | 11/2006 | Kalthoff et al. | |
| 7,853,899 B1 | 12/2010 | Kalthoff et al. | |
| 8,499,036 B2 | 7/2013 | Kalthoff et al. | |
| 8,521,838 B2 | 8/2013 | Bestfleisch et al. | |
| 8,850,390 B2 | 9/2014 | Eschenroeder et al. | |
| 8,875,122 B2 | 10/2014 | Driesen et al. | |
| 8,935,234 B2 * | 1/2015 | Pattabhi | ............ G06F 16/24542 |
| | | | 707/718 |
| 9,065,705 B2 | 6/2015 | Schmidt et al. | |
| 9,754,000 B2 | 9/2017 | Kreindlina et al. | |

(Continued)

OTHER PUBLICATIONS

U.S. Appl. No. 10/306,718, filed Nov. 27, 2002, Kalthoff et al.
U.S. Appl. No. 10/335,083, filed Dec. 30, 2002, Damaschke et al.
U.S. Appl. No. 16/856,233, filed Apr. 23, 2020, Ofenloch.

*Primary Examiner* — Muluemebet Gurmu
(74) *Attorney, Agent, or Firm* — Fish & Richardson P.C.

(57) ABSTRACT

The present disclosure relates to computer-implemented methods, software, and systems for managing data replication between different source sections and target sections in response to received copy instructions associated with copy profiles. In response to evaluating statistical metadata identifying whether data records in relation to at least one client are included for a table from a first set of tables, a first subset of tables from the first set of tables is determined. In response to evaluating update metadata defining latest updates of tables from the first subset of tables, a second subset of tables from the first subset of tables is determined that defines tables that include updated data records relevant for copying. The second subset tables are iteratively evaluated to define corresponding operations to be performed for tables at the target section and at the source section in the database in relation to the requested copy operation.

20 Claims, 7 Drawing Sheets

(56) References Cited

U.S. PATENT DOCUMENTS

| | | |
|---|---|---|
| 9,852,385 B2 | 12/2017 | Heusermann et al. |
| 2003/0182167 A1 | 9/2003 | Kalthoff et al. |
| 2004/0044730 A1 | 3/2004 | Gockel et al. |
| 2004/0117377 A1 | 6/2004 | Moser et al. |
| 2005/0091179 A1 | 4/2005 | Kalthoff et al. |
| 2007/0038686 A1 | 2/2007 | Kalthoff et al. |
| 2010/0070556 A1 | 3/2010 | Heusermann et al. |
| 2011/0055738 A1 | 3/2011 | Damaschke et al. |
| 2011/0178990 A1* | 7/2011 | Ohkawa .................. G06F 13/00 707/662 |
| 2012/0124553 A1 | 5/2012 | Eschenroeder et al. |
| 2013/0232105 A1 | 9/2013 | Moser et al. |
| 2014/0019429 A1 | 1/2014 | Driesen et al. |
| 2016/0019276 A1* | 1/2016 | Dahbour ............. G06F 16/2282 707/626 |
| 2016/0378675 A1* | 12/2016 | Giuliani .................. G06F 16/21 711/206 |

* cited by examiner

COPY EXECUTION WITHIN A LOCAL DATABASE

TECHNICAL FIELD

The present disclosure relates to computer-implemented methods, software, and systems for database data processing in an application environment.

BACKGROUND

Software complexity is increasing and causes changes in the software product cycles, requirements, and possibilities for delivery of software applications and platform systems. Customer's needs are being transformed to request flexibility in terms of processes, landscape, and software components. Development of new software applications often times relies on existing, previously developed functionality, or on integrations between software applications to perform more complex use cases. There are a number of scenarios where software components or entire databases that are provided for reuse by customers, partners, developers, consultants, or other end users. In such scenarios, data from one section of a database may be copied to another section of a database, for example, when new client instances are instantiated, and data is provisioned for the new setup.

Database tables may be used for storing data for various purposes. In some cases, database tables may be used and evaluated in different scenarios, for example, for provisioning new client environments, for configuring new client systems, or for providing backup services. Different client environments may be configured to include default data provided by platform providers and may extend with additional customers data. A platform provider may maintain a database storage where data for different clients is stored.

SUMMARY

The present disclosure involves systems, software, and computer implemented methods for managing data replication between different source sections and target sections in response to received copy instructions.

One example method may include operations such as receiving an instruction for performing a copy operation for a first set of tables associated with a source section in a database associated with a source client to a target section in the database associated with a target client, where in the instruction identifies a profile for the copy operation; evaluating statistical metadata of the database to determine whether a table from the first set of tables is identified in the statistical metadata as including data records in relation to at least one client; in response to the evaluation, determining a first subset of tables from the first set of tables, wherein the first subset of tables includes one or more tables from the first set of tables that are identified in the statistical metadata as including data records in relation to the at least one client; in response to evaluating update metadata including information for latest updates of tables from the first subset of tables, determining a second subset of tables from the first subset of tables, wherein the second subset of tables defines tables that include updated data records relevant for copying; and iteratively evaluating tables identified in the second subset of tables to define corresponding operations to be performed for tables at the target section in the database and at the source section in the database in relation to the requested copy operation, wherein an operation to be performed in relation to a first table from the second subset of tables is defined based on a first category of the first table and the identified profile for the copy operation. Other implementations of this aspect include corresponding systems, apparatus, and computer programs, configured to perform the actions of the methods, encoded on computer storage devices.

Implementations can optionally include that the update metadata include timestamps corresponding to the latest updates of the tables that are indicative of latest performed changes of data in the corresponding tables. When evaluating the update metadata, a timestamp of a first table from the tables is compared to a timestamp of a copy operation performed for the first table from the source section to the target section to determine whether data in the first table is to be deleted at the target section and replaced with the updated data from the source section.

In some instances, in response to determining that a table from the second subset of tables is relevant for full copy operation from the second subset of tables, deleting a corresponding table at the target section and copying the table at the source section to replace the deleted table at the target section.

In some instances, the table at the source section is maintained operational while the corresponding table at the target section is deleted. The source section is associated with a first client and during operational mode receives interactions to store or update data at one or more of the tables instructed for copying.

In some instances, the source section is locked for performing data interactions during the iterative evaluation of the tables at the second subset and until a copy operation from the target is performed.

In some instances, in response to evaluating categories of the tables in the second subset of tables and the identified profile for the copy operation, defining at least one table from the second subset of tables that is excluded from copying from the source section to the target section when a category of the at least one table and the identified profile correspond to a delete operation to be performed for the at least one table at the target section.

In some instances, in response to evaluating categories of the tables in the second subset of tables and the identified profile for the copy operation, defining at least one table from the second subset of tables that is selected for copying from the source section to the target section when a category of the at least one table and the identified profile correspond to a delete operation to be performed for the at least one table at the target section and a copy operation to be performed from the source section to the target section of the defined at least one table.

In some instances, in response to evaluating categories of the tables in the second subset of tables and the identified profile for the copy operation, defining at least one table from the second subset of tables that is selected for partial copying from the source section to the target section when a category of the at least one table and the identified profile correspond to a delete operation to be performed for the at least one table at the target section and a copy operation to be performed from the source section to the target section of a set of data records from the defined at least one table. The set of data records correspond to a predefined criteria provided as instruction for the received instruction for copying.

In some instances, the statistical metadata including statistics of different tables and corresponding record counts in the tables in relation to different clients associated the database.

In some instances, the profile for the copy operation is selected from a plurality of preset profiles. The profile is indicative of a type of data relevant for the copy operation.

In some instances, tables in the database are associated with corresponding categories, and a category from the categories is mapped to a profile from the plurality of preset profiles and is mapped to an execution of at least one operation at the source section or the target section.

In some instances, executing a delete operation in relation to a first table from the second subset of table from the target section. The first table at the target section is locked for accessing before executing the deletion. The first table is identified with a full copy operation based on the evaluation of the tables in the second subset of tables. After performing the deletion of the first table at the target section, the first table is locked for accessing at the source section. A copy operation is performed for the first table at the source section and transferring the copy of the first table at the target section. The performed transferring of the copy of the first table from the source section to the target section is performed within the database and without accessing an application layer communicatively coupled to the database to provide database services; and unlocking the first table at the source section and at the target section after the transfer of the copy.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques for managing data replication between different database areas related to different clients in response to received copy instructions.

A database may store contents that include more than hundreds of thousands of database tables in one place. The database may organize the database-table content into containers, where the containers may be used in different configurations, landscape environments, and/or set-ups, for example, for a particular client, a client project, a product version, etc.

In some instances, the tables defined in the database may be assigned in sets to particular clients and/or projects. In some of those instances, the database tables from the storage can be assigned to more than one client. In such setups, tables may be assigned in sets to particular clients or client account, and tables corresponding to different client accounts may be stored at different sections or areas of the database. Tables of a database may be identified by table names and stored in database sections associated with a client and/or a client account.

In some instances, one table name may be associated with multiple instances of tables that may be related to different clients. For example, a table name, such as "Table A", may be associated with two clients and data in the two client-specific instances may be different. For example, the first instance may store 100 records and the second instance may store 200,000 records.

In some instances, the database may maintain metadata for the tables that are stored, including a table category, a client identifier, table size, a number of records in the table, timestamps for latest interactions with the table, timestamps of table creation time, an identification of a user owner of the table, etc. Such metadata may be organized in one or more tables and may be maintained iteratively whenever there is a change in the data stored in the tables at the database. The metadata may be organized in different granularity in relation to the details for the different tables.

In some instances, the database may store metadata related to tables' statistics and tables' records. For example, there may be statistics metadata including information for record counts in tables that are identified by their table name. For example, "Table A" may be associated with two clients identified with different client identifiers, e.g., client ID 100 and 200, and the table instances may be assigned different table identifiers. For such a table, metadata may be stored such as in Table 1 below.

TABLE 1

Table A

| Client ID | Table Keys |
|---|---|
| 100 | X |
| 200 | Y |

For example, "Table A" with identifier X may store three data records—A, B, and C, and "Table A" with identifier Y may store two data records—A, B, and C. Further, the database may store metadata statistics in relation to the number of records per table such as in Table 2.

TABLE 2

| Table Name | Records Count |
|---|---|
| A | 3 |
| A | 2 |

In some instances, there may be data manipulation in relation to the table at client 100 and the table may be cleared of content due to the manipulation. Therefore, the record count in the metadata statistics may be updated to refer to "Table A" as associated with records count 0 and 2.

In some instances, the database may receive requests for performing a copy operation of tables between different clients. In such cases, tables from a database section associated with a first client, i.e., a source client, are to be transferred to a database section associated with a second client, i.e., a target client. Further, the database section associated with the second client may store some data in database tables. For example, the target section associated with the target client may have been populated with data in tables in relation to a previous version of the first client. The copy operation may be requested in relation to different scenarios, such as maintaining a backup or replicating part of data from the source client in relation to a particular scenario or purpose. Therefore, the copy operation may be provided with a profile for the execution of the copy operation.

In some instances, for copying of database tables from different database sections, the data associated with the copying may be required to be locked during the execution to provide data consistence in relation to providing services based on the data stored at the relevant database tables. When a copy operation is performed, it may be necessary that the tables that are copied are not changed during the execution of the copying, as that may provide data discrepancies, and also if data in the tables is accessible and changed during the copying, that may interfere with the relevant data that has to be copied. Further, as the target section is to receive new content, access to content at the target section during the transferring of data may also be restricted. To address the requirement to provide consistent copying of data and limiting data discrepancies and, at the same time, to limit the downtime for accessing data at the sections of the database, locking of data and limiting access to the data in tables in both locations may be improved by arranging the copy procedure as to limit the necessary time for locking of database tables.

In some instances, when performing a copying from the source section associated with a source client to a target section of the target client at a database, the data replication and transfer may be performed at the database layer without extracting data through an application layer and pushing the data back in the database layer at the target location. The data transfer may be performed at the database and, to improve the accessibility of the data at the database and thus to improve database services, the target section of the database may be first deleted from content, where the copy operation may be performed after the deletion of the content at the target. In such manner, the source section may not be necessary to be locked during the execution of the delete operation at the target section. In comparison to performing a sequential copying and pasting of tables one by one from a source to a target, an implementation where deletion is performed first provides for longer period of operation mode of the source tables associated with the source client. The tables at the target section may be locked when a deletion for a table is initiated, and may be unlocked upon successful copying of the table from the source section.

In some instances, when a copy request is received, the identified source section including tables associated with a source client, such as a client with ID of 100, may include some tables that are empty, others that have not been changed or updated for a long period, and/or some that may be not relevant for the requested copy operation as not complying with a copy criteria provided with the copy request, as well as tables that have to be copied in full at the source section is relevant for the copy operation and has to be fully included at the target section. To provide a copying functionality from the source section to the target, a copy function may include an algorithm for identifying relevant tables for the request, which can improve the process by reducing the resources spent and improve the accessibility of data at the database. In some cases, there may be evaluation logic implemented to analyze the received request and metadata stored for the tables in relation to the copy request to determine operations to be performed for each of the tables. For example, some of the tables stored at the source section may be determined as irrelevant for the copying, and others may be determined as relevant but only in part based on filtering the data according to data evaluations. Other suitable determinations and evaluations can be performed to improve the process. The identification of an exit operation to be performed for a table requested for copying may be based on an improved algorithm for metadata evaluation and mapping of the metadata with received copy instructions.

Figure 1:
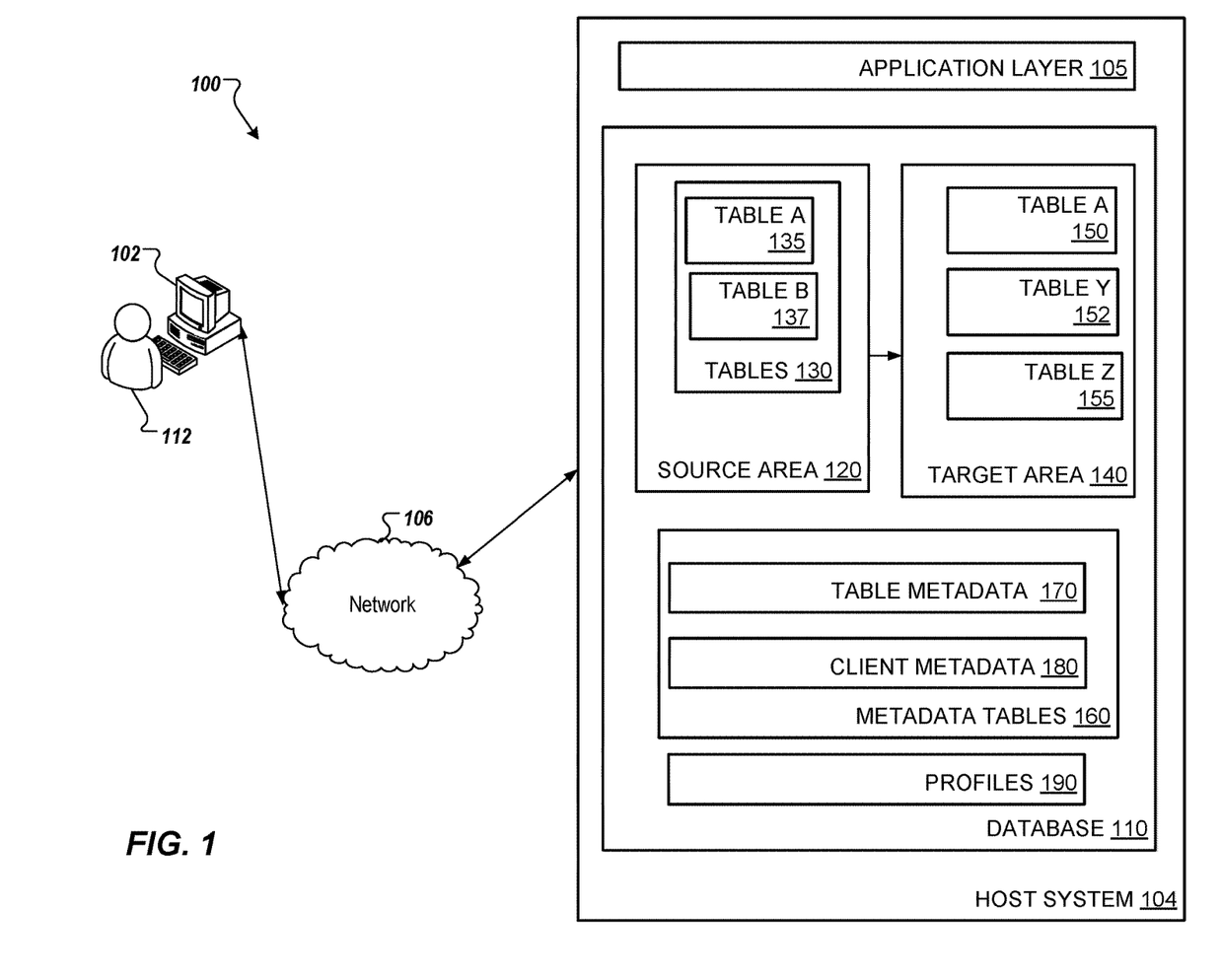
FIG. 1 illustrates an example computer system architecture that can be used to execute implementations of the present disclosure.

FIG. 1 depicts an example architecture 100 in accordance with implementations of the present disclosure. In the depicted example, the example architecture 100 includes a client device 102, a network 106, and a host system 104. The host system 104 includes one or more server devices and databases 108 (e.g., database 110). In the depicted example, a user 112 interacts with the client device 102.

In some examples, the client device 102 can communicate with the host system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the host system 104 includes at least one server and at least one data store (e.g., database 110). In the example of FIG. 1, the host system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the host system 104 can host a database 110. The database 110 may be a database storage maintained by a software service provider, a platform provider, or any other suitable provider or entity, where data is maintained (e.g., in relation to different customer landscapes, different clients, different products and product releases, etc.).

In some instances, the host system 104 may host the database 110 where data is organized in relation to clients and/or projects. Table content may be organized into containers to support different customer scenarios and product deliveries. The database may include database sections storing different data in tables in relation to different clients and/or projects. The database 110 includes multiple areas of database tables that are associated with one or more clients, such as source area 120 and target area 140. For example, the source area 120 and the target area are associated with two different clients identified with different client identifiers. The areas in the database 110 may be portions of data allocated to different client and identified by different client identifiers.

The database 110 may include multiple tables with the same table name where different instances of the table may store different data, and different number of records within the table instances.

In some instances, the database 110 may store metadata table 160 for the database 110. The metadata tables may include table metadata 170 and client metadata 180. The table metadata 170 may include information for the tables stored at the database 110 and their category, size, number of records, timestamps, user data, etc. The client metadata 180 may include information about client identifiers, assigned tables to different clients, ranges of data within the database 110 where data for a particular client is stored and other client specific properties. The database 110 includes profiles 190 that can be defined for performing copy operations between different clients. The profiles 190 can include multiple types of profiles that identify which tables are to be copied from one client to another.

In some instances, the profiles 190 may include different predefined copy profiles that can define which data is to be copied to a target clients before copying takes place. When a request is received for performing a copy operation at the database 110, the request may be provided with a copy profile from the define set of profiles at the profiles 190. Copy profiles may be evaluated when a copy operation is performed. Based on such copy profiles, the selection and combination of the components to be copied may be facilitated. For example, the profiles 190 may include a first copy profile that identifies that the relevant data for copying is data for users, user roles and authorization profiles. In another example, the profiles 190 may also include a second copy profile that defined that the data relevant for copying is client-dependent customizing, including authorization profiles, where such profile may be interpreted to exclude copying of application data from a source to a target client upon request. Further profiles may be defined that provide different criteria for determining which data is to be copied from a source to a target client upon request.

The table metadata 170 may be stored at one or more tables and can be arranged at different detail level. For example, the table metadata 170 may include statistical metadata about numbers of records that a table identified by a table name stores, such as the data in Table 2 above.

Further, the table metadata 170 may include metadata that identifies a table name and the associated client identifiers related to such a table name. For example, such metadata may be such as the data in Table 1 above.

In some instances, user 112 may request through the network 106 for performing a copy operation of data stored at the source area 120 to the target area 140. The copy operation request may be provided with a copy profile. The copy profile may be identified at the profiles 190. Based on the requested copy profile and evaluation of the metadata at the profiles 190, criteria for identifying relevant data for the request copy operation may be determined and applied during the execution of the copy operation. The tables at the source area 120 may be evaluated to determine which of the tables are relevant for the copy operation, whether only a part of them is relevant for the copy operation (e.g., just part of the data complying with the criteria identified in the copy profile), or whether a part of the data of a table is relevant, or whether there is no table relevant for the copy operation. In some instances, a table can be relevant only for a deletion operation. Based on evaluation in relation to the tables at the source area 120, corresponding exit operations may be defined for each of the tables that correspond to the evaluation and the defined copy profile. The exit operation can refer to application or platform framework specific code that is executed for relevant tables and table content.

In the illustrated implementation, database 110 includes source area 120 and target area 140, where both areas include a table with a common name, "Table A." The received copy request is for transferring the content from the source area 120 the target area 140, so that the target area 140 has the same, equivalent data as in the source area 120. When the copy operation is requested, the target area 140 is populated with data, such as Table A 150, Table Y 152, and Table Z 155. As illustrated, source area 120 includes tables 130 including Table A 135 and Table B 137, and target area 140 includes Table X 150, each instance having the name "Table A." The target area 140 may include further tables, such as Table Y 152 and Table Z 155, which are not part of source area 120. The database 110 may further include other areas (e.g., sections (not shown)) including tables that may correspond to the names of the tables that are part of source and target areas.

In the present example, the source area 120 may be associated with a client with an identifier 100, and the target area 140 may be associated with a client with an identifier 200, and Table A 135 may be such as the Table A discussed above and in relation to Table 1. To determine whether Table A at the source area 120 is relevant for the copy request, the statistical metadata at the table metadata 170 may be evaluated first to determine whether Table A 135 includes any content or whether it is an empty table. When a table is empty and has no content, that table does not need to be copied as no data is to be transferred, and can be excluded from the copy. To determine whether Table A is relevant for the copy procedure, an evaluation of the statistical metadata may be performed. If it is determined that Table A has an instance in the database 110 that includes records based on evaluation of the statistical data including data for table names and number of records (e.g., record count), then there may be further evaluations to be performed for Table A 135. By reviewing the statistical data that provides track of database tables associated with multiple clients, we may determine in a fast manner, whether we can exclude a table for further evaluations. The statistical metadata includes information for table instances in relation to multiple clients associated with the database 110. When there is a record in the statistical metadata identifying that a table with a particular name, e.g., Table A, is stored in the database 110 and includes data, then it may not be concluded directly that the Table A is not relevant for the copying. On the other hand, if the statistical metadata include records for Table A and all of this indicates that Table A is associated with zero records (record counts equal to 0), then Table A 135 may be determined to be excluded from further evaluations for the copy procedure, as the table is empty and does not have to be copied. Further, Table B 137 at the source area 120 may be determined in two records at the statistical metadata, where the two records identify Table B 137 as associated with record count equal to 0. Even though these records cannot be distinguished as to which client or area of the database 110 they are assigned to, because all records for Table B 137 identify Table B 137 as empty, Table B 137 may be excluded from further evaluation for the copy procedure and may be determined that Table B 137 is not to be copied. When it is determined that Table B 137 is not to be copied, then if there is a Table B in the target area 140, such table is to be deleted. Such a search performed within the statistical metadata may be executed fast and may save on processing time for evaluation of tables requested for copying. In such manner, a first pre-filtering can be performed to reduce the number of tables from the source area 120 that has to be evaluated to determine what operations have to be done in relation to the copying.

In the present implementation and according to this example, once tables at the source area 120 are filtered to identify whether there are tables that are excluded from copying because they are empty (as discussed above in relation to evaluation of statistical metadata), a subset of the tables at the source area 120 may be defined. Here, Table A has records (see Table 2), so it cannot be excluded from further evaluation and is part of the defined subset of the tables at the source area 120. The subset of tables is then further evaluated to determine whether there are tables in the subset that have not been changed since a previous copy operation. In those instances, an equivalent copy of such tables is already present at the target area 140 and further copying is unnecessary. For example, there may be regularly scheduled copy operations between the source area 120 and the target area 140, or there may be interruptions in the process of copying between the source area 120 and the target area 140. In such cases, the target area 140 may store some of the data from the source area 120. By evaluating the metadata related to latest updated information and timestamps of copy operation executions, it may be determined whether a table that is stored at the target area 140 needs to be replaced with a new copy of the table with the same name from the source area 120, or whether the current version of the table is already stored at the target area 140.

In some implementations, a last updated timestamp of a table from the tables at the source area 120 at the database 110 may be compared with the timestamp of the last client-copy operation on that table. Where the last update of the database table matches the timestamp of the last executed client-copy operation (where the copy operation was executed with the same source and target client), the table can be excluded from the copy operation. In addition, it may also be determined whether a previous copy operation between the source and target clients has an identical copy profile. In some instances, a time synchronization between database servers storing the data and an application layer 105 for the executing the copy procedure may be performed. By comparing the timestamps of the update operation in the database and application layer, a time deviation can be calculated that is accurate to the second or better.

In some instances, after evaluation of the metadata a final subset of the tables at the source area 120 would be determined and corresponding operation (i.e., exit operation) to be performed on each table is to be determined. The corresponding operation may be determined by mapping the received copy profile with the requested copy operation and metadata for the tables. For example, the received copy profile may be mapped to a table class category assigned to each table at the database. The class category may be identified at the table metadata 170. The class category may define a delivery class for the table by identifying whether the data stored in the corresponding table is application data, user data, master data, temporary data, etc. Therefore, categories of tables may correspond to type of data stored at the tables.

In accordance with the current implementations, the tables at the final subset of tables is analyzed to determine a corresponding exit operation. A set of exit operations may be predefined that correspond to a particular category of a table and a particular copy profile. The set of exit operations may be defined in a mappings table where a first category of a table may be mapped to a first copy profile and mapped to a particular exit operation. The exit operations may include one or more operations that has to be performed at the target area and at the source area.

In some instances, once exit operations are defined for the tables at the source area 120, the exit operations are iteratively evaluated and copy operation is initiated, where the procedure is to be performed in two phases: a deletion phase where the target area 140 is emptied by execution of a delete operation for each table that is marked for deletion operations at the exit operations, and a copy phase where data from the source is copied to the target area. The copy operation may be executed in batches of tables. The execution of the copy operation after the delete operation at the target area 140 may be performed by execution of a command, such as command (1):

INSERT INTO<target-area>FROM SELECT<source-area> (1)

Therefore, as data is processed exclusively on the database layer, for example, by using an "INSERT FROM SELECT" SQL statement, it is not required to transfer the data to the application layer 105 and the transaction is completely managed by the database 110.

To speed up the processing of both phases, the deletion and copying can be executed in any number of parallel processes. The client copy can be executed from any client section other than target section and does not require a restart of the application layer 105. The number of parallel processes can be defined by the user.

In some instances, the implementation of the copy procedure, for example in a copy tool provided at the database 110, provides multiple improvements. For example, evaluation of data at the source to initiate the procedure is improved as pre-evaluation is performed in faster manner over metadata, such as statistical metadata and update metadata. Empty tables and unchanged database tables are excluded from the copy process. Further, as the deletion is performed before the copy operation, the time span when data is locked for accessing at both the source and the target area is minimized. The usage of exclusive locks reduces the database memory footprint and speeds up the copy procedure by more than a factor of 2. According to implementations of the present disclosure, a full deletion on all tables at the target area is performed first. After all tables have been cleared, the tool continues copying the data from the source client. This order allows the solution to reduce the downtime further, as the source client must be locked only in the copy phase.

Figure 2:
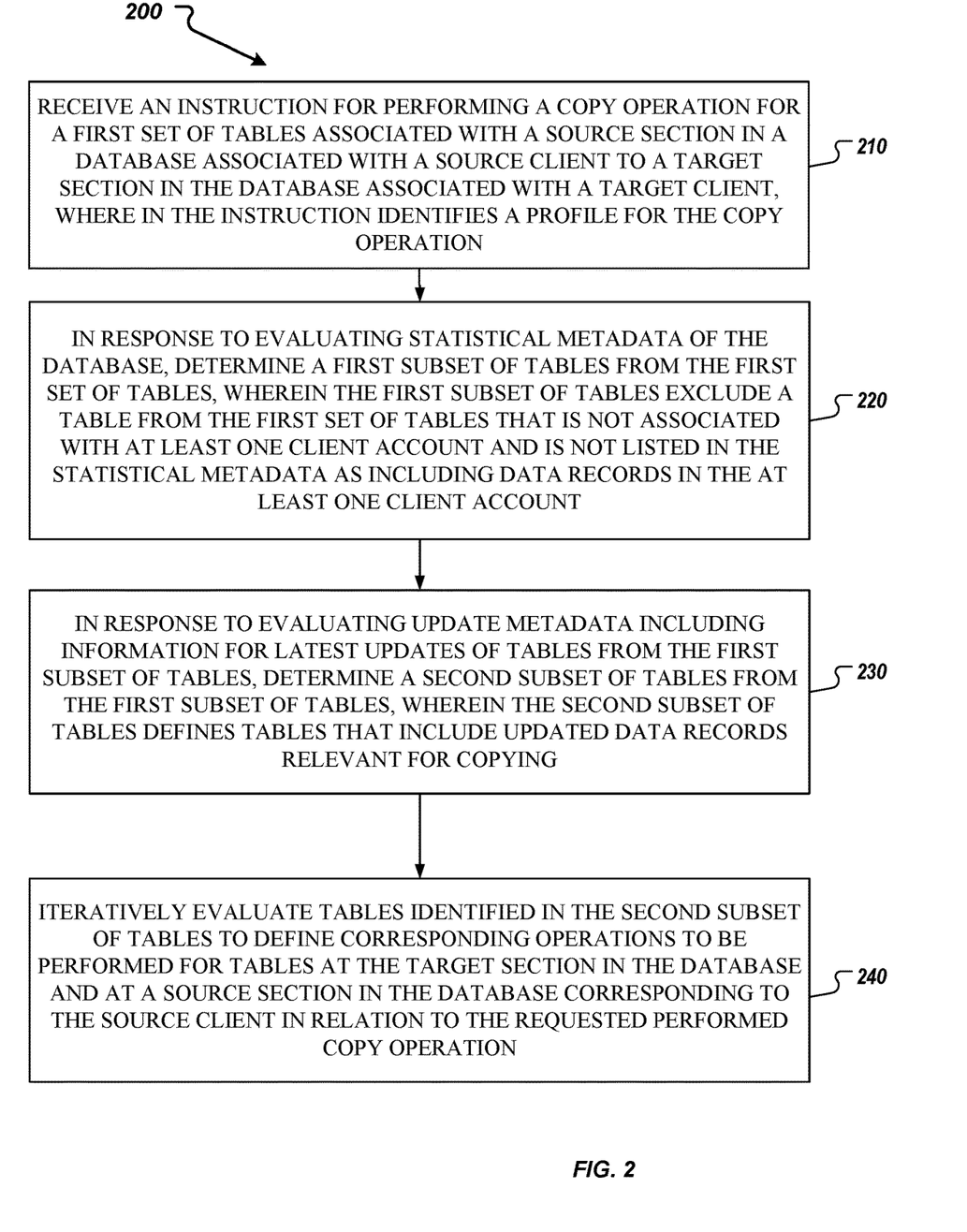
FIG. 2 is a flowchart for an example method for performing identification of tables and corresponding database operations to be executed over data within a database in relation to a received copy operation instruction in accordance with example implementations of the present disclosure.

FIG. 2 is a flowchart for an example method 200 for performing identification of tables and corresponding database operations to be executed over data within a database in relation to a received copy-operation instruction in accordance with example implementations of the present disclosure. The method 200 may be executed in relation to a request received at a database, such as the database 110 of FIG. 1.

At 210, an instruction for performing a copy operation for a first set of tables associated with a source section in a database to a target section in the database is received. The source section in the database may be associated with a source client and the target section in the database may be associated with a target client. The instruction identifies a profile for the copy operation.

In some instances, the received instruction for the copy operation may be similar to the request for copying from the source area 120 to the target area 140 discussed in relation to FIG. 1. The received request for the copy operation of table content may be also defined as a request for copying from a first client to a second client, where the first client is associated, for example, with the source area 120, and where the second client is associated, for example, with the target area 140.

In some instances, the copy operation may be defined as relevant only for a particular type of data defined in the profile, such as user data, customization data, all table data, other.

At 220, in response to evaluating statistical metadata of the database, a first subset of tables from the first set of tables is determined. The first subset of tables may be determined to exclude a table from the first set of tables that is not associated with at least one client from a plurality of clients associated with the database. The table that is identified to be excluded from copying may be determined based on the statistical metadata stored in the database.

In some instances, the statistical metadata of the database is evaluated to determine whether a table from the first set of tables is identified in the statistical metadata as including data records in relation to at least one client, as discussed in relation to Table A 135 of FIG. 1. In response to the evaluation, the first subset of tables that is determined from the first set of tables includes tables from the first set of tables that are identified in the statistical metadata as including data records in relation to the at least one client.

The statistical data may be such as the metadata described in relation to Table 2 and includes properties identifying a table by a table name and a record count for the number of records (e.g., table rows) in an instance of a table with the same name. Based on evaluating the statistical data, it may be determined that the table is identified as not including data records (e.g., record count equal to 1) in relation to the at least one client.

For example and as discussed in relation to Table A 135 of FIG. 1, Table A 135 cannot be excluded from the first set of tables, as the statistical metadata of Table 2 shows that there are table instances with name Table A that include records. Further and for example, if Table A 135 has no records at the source area, and there is Table A at another section, for example, at the target section, or a section associated with another client, then the statistical metadata will include records indicating that a table with name Table A has records (record count different from) and then Table A 135 cannot be excluded from further evaluation.

At 230, in response to evaluating update metadata, such as information for the latest updates of tables from the first subset of tables, a second subset of tables from the first subset of tables is determined. The second subset of tables defines tables that include updated data records relevant for copying.

In some instances, 230 may be an optional step for the execution of the method 200 and the first subset of the tables that is determined at 220 may be interpreted as the second subset for further evaluation.

In some instances, the update metadata include timestamps corresponding to the latest updates of the tables that are indicative of the latest modifications to data in the corresponding tables. When evaluating the update metadata, a timestamp of a first table from the tables is compared to a timestamp of a prior copy operation performed for the first table copying data from the source section to the target section. Using this information, a determination can be made to whether data in the first table is to be deleted at the target section and replaced with the updated data from the source section, as it can be determined whether there is a difference in the data stored in the target section and in the source section based on the comparison of the timestamps.

At 240, tables identified in the second subset of tables are iteratively evaluated to define corresponding operations to be performed for tables at the target section in the database and at the source section in the database in relation to the requested performed copy operation. An exit operation(s) to be performed in relation to a first table from the second subset of tables is defined based on a first category of the first table and the identified profile for the copy operation.

In some instances, a first category of a first table may be mapped to the received copy profile and to a corresponding exit operation. A mapping between different table categories, different copy profiles, and corresponding exit operation(s) may be predefined and used by logic of the copy operation to perform the request.

In some instances, the exit operation defines a predetermined order of performing the deletion and the copying, where the deletion at the target section is performed prior to copying the table data from the source and pasting the copied table data to the target section. In some cases, the exit operation cannot be changed to provide a change of the order of performing the operations and is fixed. In some instances, the exit operation can state that a deletion step in relation to table data at the target can be omitted.

In some instances, based on the defined corresponding operations at 240, a deletion operation may be executed at the target section, where the deletion operation deletes a first table included within the second subset of tables. The first table at the target section may be locked for accessing before executing the deletion operation. The first table may be identified as associated with performing of a full copy operation based on the evaluation of the tables in the second subset of tables, e.g., as defined in a predefined mapping between categories, copy profiles, and corresponding operations (e.g. exit operations). After deleting the first table at the target section, the first table at the source section may be locked for accessing and a copy operation for the first table at the source section may be performed. The copied first table may then be transferred to the target section. The transfer can be performed within the database and without accessing an application layer communicatively coupled to the database to provide database services. The first table at the source section and the copied version of the first table at the target section may be unlocked after the transfer.

Figure 3A:
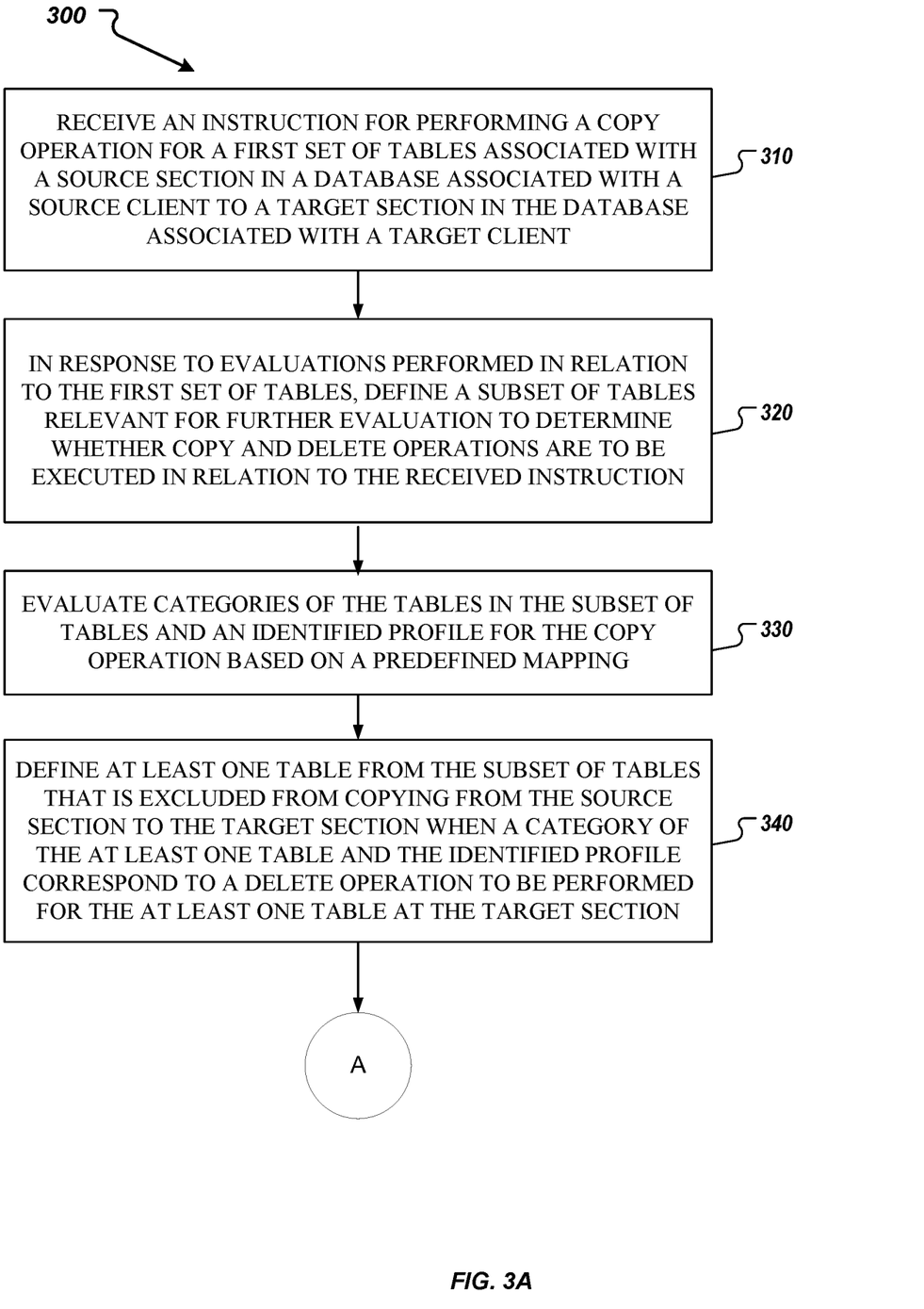
FIG. 3A and FIG. 3B are two flowcharts for an example method for evaluation of metadata in relation to tables stored in a database to determine corresponding operations to be performed to the tables based on a received copy instruction for the tables in accordance with example implementations of the present disclosure.
Figure 3B:
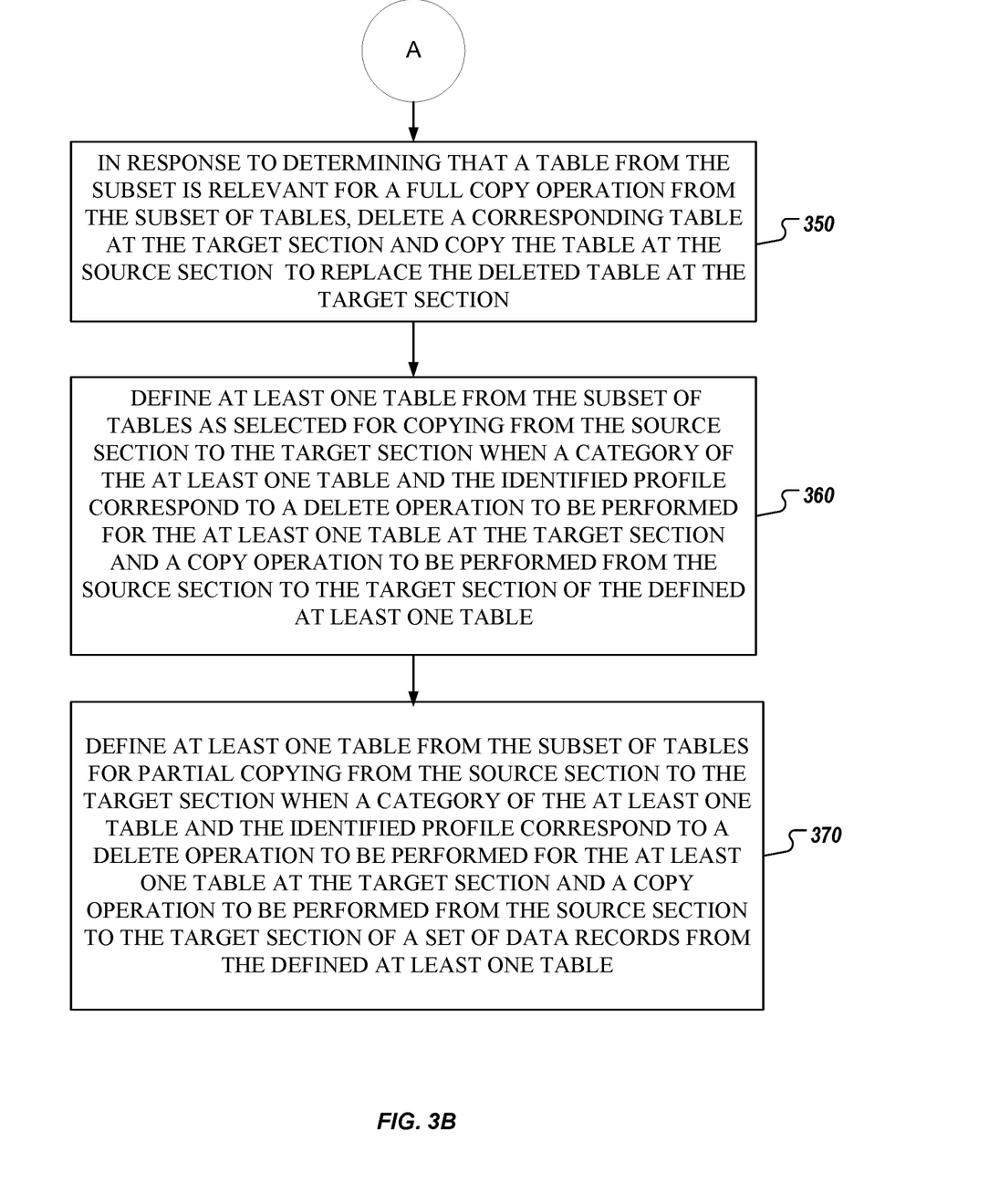

FIG. 3A and FIG. 3B are two flowcharts for an example method 300 for evaluation of metadata in relation to tables stored in a database to determine corresponding operations to be performed to the tables based on a received copy instruction for the tables in accordance with example implementations of the present disclosure. In some instances, the execution of the method 300 may be as discussed above in relation to a received request for copying table data from the source area 120 to the target area 140 of FIG. 1, and method 200 of FIG. 2.

At 310, an instruction is received for performing a copy operation for a first set of tables associated with a source section in a database associated with a source client to a target section in the database associated with a target client.

At 320, in response to evaluations performed in relation to the first set of tables, a subset of tables relevant for further evaluation to determine whether copy and delete operations are to be executed in relation to the received instruction is defined.

At 330, categories of the tables in the subset of tables and an identified profile for the copy operation are evaluated based on a predefined mapping. For example, the predefined mapping may define multiple combinations between different table categories, different copy profiles, and corresponding copy and/or delete operations at the source/target area.

At 340, at least one table from the subset of tables is defined to be excluded from copying from the source section to the target section when a category of the at least one table and the identified profile correspond to a delete operation to be performed for the at least one table at the target section.

At 350, in response to determining that a table from the subset is relevant for a full copy operation from the subset of tables, a corresponding table at the target section is deleted and the table at the source section is copied to replace the deleted table at the target section.

At 360, at least one table from the subset of tables is defined as selected for copying from the source section to the target section when a category of the at least one table and the identified profile correspond to a delete operation to be performed for the at least one table at the target section and a copy operation to be performed from the source section to the target section for the defined at least one table.

At 370, at least one table from the subset of tables is defined for partial copying from the source section to the target section when a category of the at least one table and the identified profile correspond to a delete operation to be performed for the at least one table at the target section and a copy operation to be performed from the source section to the target section of a set of data records from the defined at least one table.

Figure 4:
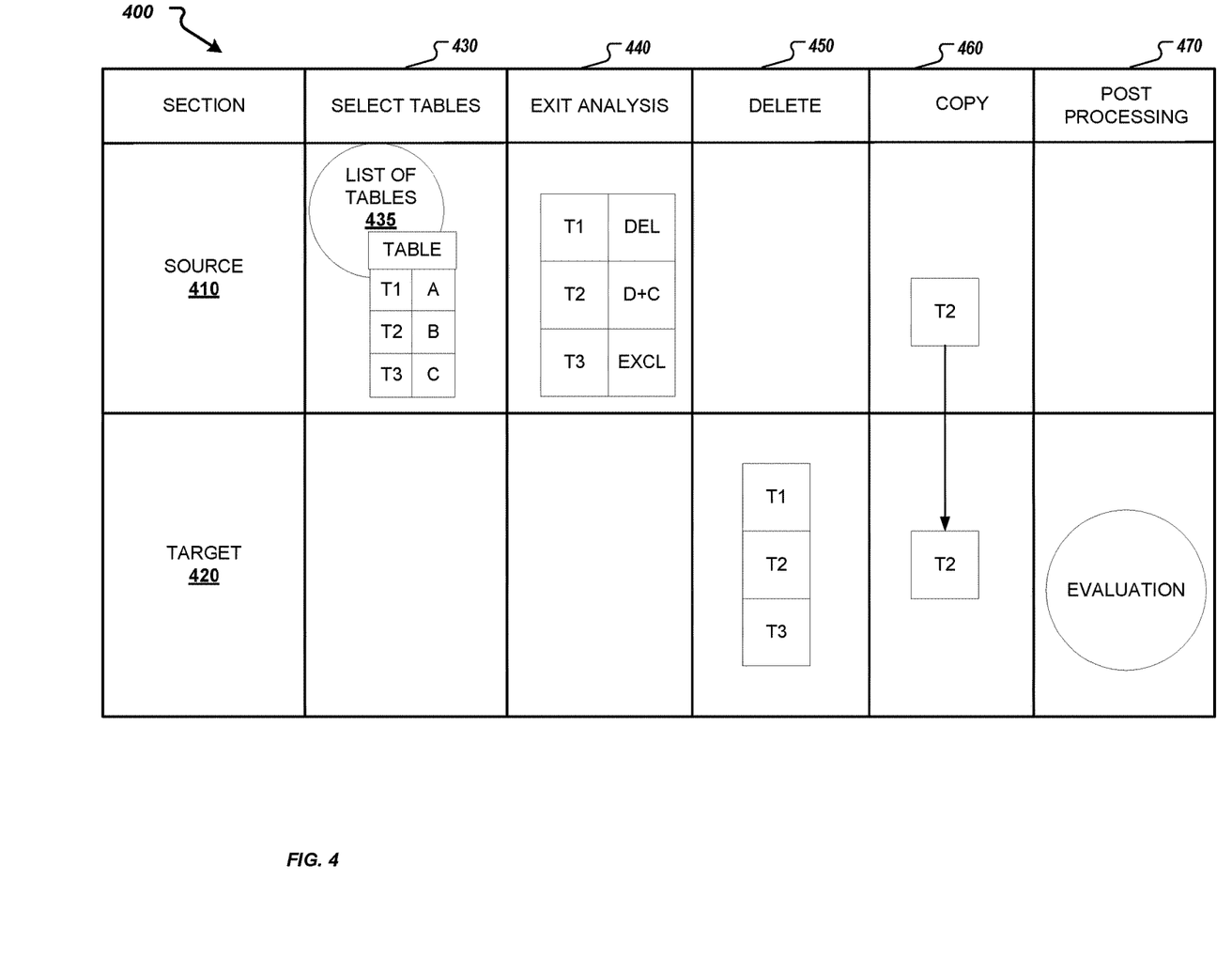
FIG. 4 is a block diagram for an example sequence of operations to be performed in relation to a receive copy instruction in accordance with example implementations of the present disclosure.

FIG. 4 is a block diagram for an example sequence 400 of operations to be performed in relation to a receive copy instruction in accordance with example implementations of the present disclosure. The example sequence 400 of operations may correspond to the described methods 200 of FIG. 2 and 300 of FIG. 3.

The example sequence 400 defines operations, such as select tables 430, exit analysis based on profiles 440, delete 450, copy 460, and post processing 470. The sequence 400 is related to both the source 410 and the target 420, and in relation to a received request for performing a copy operation, for example, at 210 of FIG. 2 and at 310 of FIG. 3. Some of the operations are performed at the source 410, and other are performed at the target 420, as presented on FIG. 4.

At 430, based on the received request, a select tables operation is performed at the source 410. The selection of tables may be performed as described in relation to method 200 and method 300. A list of tables 435 may be generated, where the list of tables 435 may correspond to the second subset of tables as defined at 240 of FIG. 2, or as the defined subset at 320 of FIG. 3.

An exit analysis is performed at 440 at the source 410, where the exit analysis is performed by evaluating the list of tables 435 to determine corresponding categories of the identified tables, and to map the tables based on the categories to a corresponding exit operation, as discussed in relation to FIG. 1, FIG. 2, or FIG. 3.

At a delete 450 operation, a set of tables identified at the exit analysis 440 as relevant for copying (and implied deletion) are deleted at the target 420.

At 460, a copy operation is performed for the tables identified at the exit analysis 440 as relevant for the copying and requiring content from the source 410 to be transferred at the target 420.

At 470, post processing may be performed at the target 420 to determine whether the executed copying is completed successfully. In some instances, post processing can be related to application specific data adjustment to new environment, e.g., (re)generate secondary data or replacing certain field values (e.g. because the values referred to prior client ID or use IDs)

Figure 5:
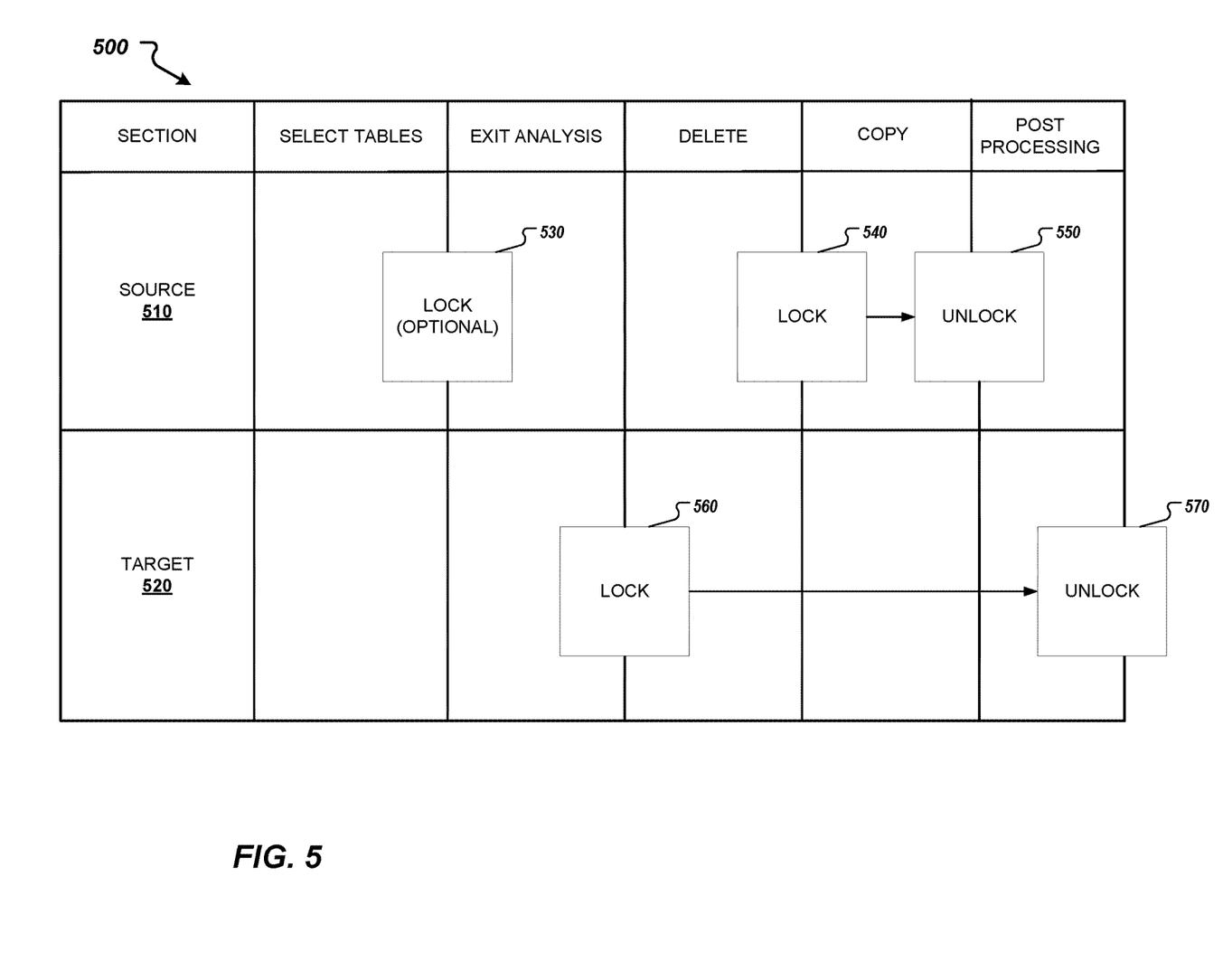
FIG. 5 is a block diagram for an example sequence of lock and unlock operations in relation to tables associated with a source and a target client when performing a requested copy operation in accordance with example implementations of the present disclosure.

FIG. 5 is a sequence diagram for an example sequence 500 of performing a lock and unlock operations in relation to tables associated with a source and a target client when performing a requested copy operation in accordance with example implementations of the present disclosure. For example, the requested copy operation may be as discussed in relation to FIG. 1, FIG. 2, and/or FIG. 3. The requested copy operation is for transferring table data from a source area associated with a source client to a target area associated with a target client. The sequence 500 is defined in relation to a source 510 and a target 520, where the sequence 500 is for performing a lock and unlock operation for the data at the source 510 and the target 520 in the line of the timeline of performing operations as described at sequence 400 of FIG. 400.

In some instances, when performing method 200 of FIG. 2 or method 300 of FIG. 3, different operations are executed in relation to the source and target section. For example, the operations executed in relation to the source and the target section may be such as the sequence 400 of FIG. 4.

In some instances, when a copy operation is performed from one area of a database to another area of the database, locking of the data at both areas may be necessary at a certain period of time to provide data consistency. The present implementations of the copying algorithm provide for improved accessibility of the data at the database during copying procedures so downtime may be reduced. The downtime may be reduced by optimizing the management of locking and unlocking of data at source and target areas based on the two-phase copying where a delete operation at the target is performed prior to performing of a copy-paste operation.

In some instances, data at the target 520 may be locked (560) for accessing prior to performing a delete operation, such as the described delete 450 operation of FIG. 4.

In some instances, the lock (560) can be performed on the target as a first step in the client-copy process sequence. In such case, work performed at the target is blocked first and cannot provide possibilities to work in a client that may be locked suddenly by the system. The target 520 may be kept locked until a subsequent unlock operation is performed. The data at the target 520 has to be locked to ensure that no interaction with data is performed during a copy operation. Thus, data consistency is provided for the copy execution and the copy process is protected from failure. The target 520 may be unlocked at 570 after a copy operation is executed from the source 510 to the target 520 and post processing of the copy operation is finalized. For example, the post processing may be a final test operation to provide evaluation of the execution of the copying and to provide a status report, e.g., success, failure, error, etc.

The source 510 may be locked at 540 before a copy operation for identified tables from the source is initiated and until a copy operation is performed. Therefore, the source 510 may be unlocked at unlock 550 after the copying is finished and before a post processing operation is to be initiated. After the source 510 is unlocked, the data at the source 510 is accessible for data manipulation.

In some instances, the source 510 may be locked before an exit analysis is to be started at lock 530. Such lock 530 would be performed at an earlier point in time to ensure that no change to data categories or to type of data stored at the tables in the source 510 is allowed to be changed, therefore stays fixed from the moment the exit analysis is started. Thus, by locking at 530, safety of data processing and data integrity during copying is improved.

Figure 6:
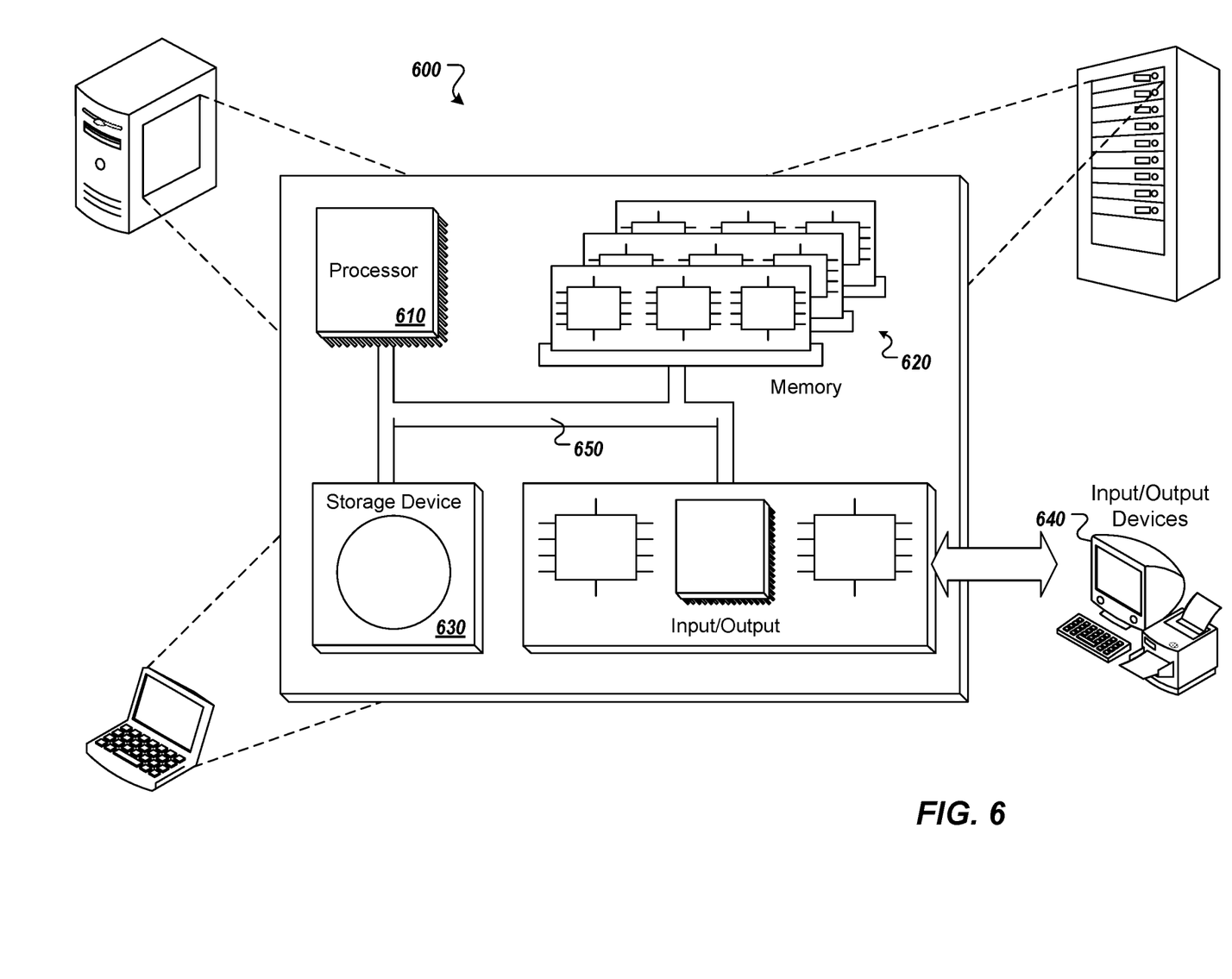
FIG. 6 is a schematic illustration of example computer systems that can be used to execute example implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method comprising:
receiving an instruction for performing a copy operation for a first set of tables associated with a source section in a database associated with a source client to a target section in the database associated with a target client, wherein the instruction identifies a profile for the copy operation, wherein the profile defines criteria to determine which type of data from the first set of tables is relevant for the copy operation;
evaluating statistical metadata of the database to determine whether a table from the first set of tables is identified in the statistical metadata as including data records in relation to at least one client;
in response to the evaluation, determining a first subset of tables from the first set of tables, wherein the first subset of tables includes one or more tables from the first set of tables that are identified in the statistical metadata as including data records in relation to the at least one client;
in response to evaluating update metadata including information for latest updates of tables from the first subset of tables, determining a second subset of tables from the first subset of tables, wherein the second subset of tables defines tables that include updated data records relevant for copying; and
iteratively evaluating tables identified in the second subset of tables to define corresponding operations to be performed for tables at the target section in the database and at the source section in the database in relation to the copy operation, wherein an operation to be performed in relation to a first table from the second subset of tables is defined based on mapping a first category of the first table with the criteria defined in the identified profile for the copy operation.

2. The method of claim 1, wherein the update metadata include timestamps corresponding to the latest updates of the tables that are indicative of latest performed changes of data in the corresponding tables, and wherein when evaluating the update metadata, a timestamp of a first table from the tables is compared to a timestamp of a copy operation performed for the first table from the source section to the target section to determine whether data in the first table is to be deleted at the target section and replaced with the updated data from the source section.

3. The method of claim 1, further comprising:
in response to determining that a table from the second subset of tables is relevant for full copy operation from the second subset of tables, deleting a corresponding table at the target section and copying the table at the source section to replace the deleted table at the target section.

4. The method of claim 3, wherein the table at the source section is maintained operational while the corresponding table at the target section is deleted, wherein the source section is associated with a first client and during operational mode receives interactions to store or update data at one or more of the tables instructed for copying.

5. The method of claim 3, wherein the source section is locked for performing data interactions during the iterative evaluation of the tables at the second subset and until a copy operation from the target is performed.

6. The method of claim 1, further comprising:
in response to evaluating categories of the tables in the second subset of tables and the identified profile for the copy operation, defining at least one table from the second subset of tables that is excluded from copying from the source section to the target section when a category of the at least one table and the identified profile correspond to a delete operation to be performed for the at least one table at the target section.

7. The method of claim 1, further comprising:
in response to evaluating categories of the tables in the second subset of tables and the identified profile for the copy operation, defining at least one table from the second subset of tables that is selected for copying from the source section to the target section when a category of the at least one table and the identified profile correspond to a delete operation to be performed for the at least one table at the target section and a copy operation to be performed from the source section to the target section of the defined at least one table.

8. The method of claim 1, further comprising:
in response to evaluating categories of the tables in the second subset of tables and the identified profile for the copy operation, defining at least one table from the second subset of tables that is selected for partial copying from the source section to the target section when a category of the at least one table and the identified profile correspond to a delete operation to be performed for the at least one table at the target section and a copy operation to be performed from the source section to the target section of a set of data records from the defined at least one table, wherein the set of data records correspond to a predefined criteria provided as instruction for the received instruction for copying.

9. The method of claim 1, wherein the statistical metadata including statistics of different tables and corresponding record counts in the tables in relation to different clients associated the database.

10. The method of claim 1, wherein the profile for the copy operation is selected from a plurality of preset profiles, wherein the profile is indicative of type of data relevant for the copy operation.

11. The method of claim 10, wherein tables in the database are associated with corresponding categories, and a category from the categories is mapped to a profile from the plurality of preset profiles and is mapped to an execution of at least one operation at the source section or the target section.

12. The method of claim 1, further comprising:
executing a delete operation in relation to a first table from the second subset of table from the target section, wherein the first table at the target section is locked for accessing before executing the deletion, wherein the first table is identified with a full copy operation based on the evaluation of the tables in the second subset of tables; and
after performing the deletion of the first table at the target section,
locking for accessing the first table at the source section;

performing a copy operation for the first table at the source section and transferring the copy of the first table at the target section, wherein the performed transferring of the copy of the first table from the source section to the target section is performed within the database and without accessing an application layer communicatively coupled to the database to provide database services; and unlocking the first table at the source section and at the target section after the transfer of the copy.

13. A non-transitory, computer-readable medium coupled to one or more processors and having instructions stored thereon which, when executed by the one or more processors, cause the one or more processors to perform operations, the operations comprising:

receiving an instruction for performing a copy operation for a first set of tables associated with a source section in a database associated with a source client to a target section in the database associated with a target client, where in the instruction identifies a profile for the copy operation, wherein the profile defines criteria to determine which type of data from the first set of tables is relevant for the copy operation;

evaluating statistical metadata of the database to determine whether a table from the first set of tables is identified in the statistical metadata as including data records in relation to at least one client;

in response to the evaluation, determining a first subset of tables from the first set of tables, wherein the first subset of tables includes one or more tables from the first set of tables that are identified in the statistical metadata as including data records in relation to the at least one client;

in response to evaluating update metadata including information for latest updates of tables from the first subset of tables, determining a second subset of tables from the first subset of tables, wherein the second subset of tables defines tables that include updated data records relevant for copying; and iteratively evaluating tables identified in the second subset of tables to define corresponding operations to be performed for tables at the target section in the database and at the source section in the database in relation to the copy operation, wherein an operation to be performed in relation to a first table from the second subset of tables is defined based on mapping a first category of the first table with the criteria defined in the identified profile for the copy operation.

14. The computer-readable medium of claim 13, wherein the update metadata include timestamps corresponding to the latest updates of the tables that are indicative of latest performed changes of data in the corresponding tables, and wherein when evaluating the update metadata, a timestamp of a first table from the tables is compared to a timestamp of a copy operation performed for the first table from the source section to the target section to determine whether data in the first table is to be deleted at the target section and replaced with the updated data from the source section.

15. The computer-readable medium of claim 13, wherein the operations further comprise:

in response to determining that a table from the second subset of tables is relevant for full copy operation from the second subset of tables, deleting a corresponding table at the target section and copying the table at the source section to replace the deleted table at the target section, wherein the table at the source section is maintained operational while the corresponding table at the target section is deleted, wherein the source section is associated with a first client and during operational mode receives interactions to store or update data at one or more of the tables instructed for copying, and wherein the source section is locked for performing data interactions during the iterative evaluation of the tables at the second subset and until a copy operation from the target is performed.

16. The computer-readable medium of claim 13, wherein the operations further comprise:

in response to evaluating categories of the tables in the second subset of tables and the identified profile for the copy operation, defining at least one table from the second subset of tables that is excluded from copying from the source section to the target section when a category of the at least one table and the identified profile correspond to a delete operation to be performed for the at least one table at the target section;

in response to evaluating categories of the tables in the second subset of tables and the identified profile for the copy operation, defining at least one table from the second subset of tables that is selected for copying from the source section to the target section when a category of the at least one table and the identified profile correspond to a delete operation to be performed for the at least one table at the target section and a copy operation to be performed from the source section to the target section of the defined at least one table;

in response to evaluating categories of the tables in the second subset of tables and the identified profile for the copy operation, defining at least one table from the second subset of tables that is selected for partial copying from the source section to the target section when a category of the at least one table and the identified profile correspond to a delete operation to be performed for the at least one table at the target section and a copy operation to be performed from the source section to the target section of a set of data records from the defined at least one table, wherein the set of data records correspond to a predefined criteria provided as instruction for the received instruction for copying;

executing a delete operation in relation to a first table from the second subset of table from the target section, wherein the first table at the target section is locked for accessing before executing the deletion, wherein the first table is identified with a full copy operation based on the evaluation of the tables in the second subset of tables; and after performing the deletion of the first table at the target section, locking for accessing the first table at the source section;

performing a copy operation for the first table at the source section and transferring the copy of the first table at the target section, wherein the performed transferring of the copy of the first table from the source section to the target section is performed within the database and without accessing an application layer communicatively coupled to the database to provide database services; and unlocking the first table at the source section and at the target section after the transfer of the copy.

17. A system comprising
a computing device; and
a computer-readable storage device coupled to the computing device and having instructions stored thereon which, when executed by the computing device, cause the computing device to perform operations, the operations comprising:
   receiving an instruction for performing a copy operation for a first set of tables associated with a source section in a database associated with a source client to a target section in the database associated with a target client, where in the instruction identifies a profile for the copy operation, wherein the profile defines criteria to determine which type of data from the first set of tables is relevant for the copy operation;
   evaluating statistical metadata of the database to determine whether a table from the first set of tables is identified in the statistical metadata as including data records in relation to at least one client;
   in response to the evaluation, determining a first subset of tables from the first set of tables, wherein the first subset of tables includes one or more tables from the first set of tables that are identified in the statistical metadata as including data records in relation to the at least one client;
   in response to evaluating update metadata including information for latest updates of tables from the first subset of tables, determining a second subset of tables from the first subset of tables, wherein the second subset of tables defines tables that include updated data records relevant for copying; and
   iteratively evaluating tables identified in the second subset of tables to define corresponding operations to be performed for tables at the target section in the database and at the source section in the database in relation to the copy operation, wherein an operation to be performed in relation to a first table from the second subset of tables is defined based on mapping a first category of the first table with the criteria defined in the identified profile for the copy operation.

18. The system of claim 17, wherein the update metadata include timestamps corresponding to the latest updates of the tables that are indicative of latest performed changes of data in the corresponding tables, and wherein when evaluating the update metadata, a timestamp of a first table from the tables is compared to a timestamp of a copy operation performed for the first table from the source section to the target section to determine whether data in the first table is to be deleted at the target section and replaced with the updated data from the source section.

19. The system of claim 17, wherein the operations further comprise:
   in response to determining that a table from the second subset of tables is relevant for full copy operation from the second subset of tables, deleting a corresponding table at the target section and copying the table at the source section to replace the deleted table at the target section,
   wherein the table at the source section is maintained operational while the corresponding table at the target section is deleted, wherein the source section is associated with a first client and during operational mode receives interactions to store or update data at one or more of the tables instructed for copying, and
   wherein the source section is locked for performing data interactions during the iterative evaluation of the tables at the second subset and until a copy operation from the target is performed.

20. The system of claim 17, wherein the operations further comprise:
   in response to evaluating categories of the tables in the second subset of tables and the identified profile for the copy operation, defining at least one table from the second subset of tables that is excluded from copying from the source section to the target section when a category of the at least one table and the identified profile correspond to a delete operation to be performed for the at least one table at the target section;
   in response to evaluating categories of the tables in the second subset of tables and the identified profile for the copy operation, defining at least one table from the second subset of tables that is selected for copying from the source section to the target section when a category of the at least one table and the identified profile correspond to a delete operation to be performed for the at least one table at the target section and a copy operation to be performed from the source section to the target section of the defined at least one table;
   in response to evaluating categories of the tables in the second subset of tables and the identified profile for the copy operation, defining at least one table from the second subset of tables that is selected for partial copying from the source section to the target section when a category of the at least one table and the identified profile correspond to a delete operation to be performed for the at least one table at the target section and a copy operation to be performed from the source section to the target section of a set of data records from the defined at least one table, wherein the set of data records correspond to a predefined criteria provided as instruction for the received instruction for copying;
   executing a delete operation in relation to a first table from the second subset of table from the target section, wherein the first table at the target section is locked for accessing before executing the deletion, wherein the first table is identified with a full copy operation based on the evaluation of the tables in the second subset of tables; and
   after performing the deletion of the first table at the target section,
      locking for accessing the first table at the source section;
      performing a copy operation for the first table at the source section and transferring the copy of the first table at the target section, wherein the performed transferring of the copy of the first table from the source section to the target section is performed within the database and without accessing an application layer communicatively coupled to the database to provide database services; and
      unlocking the first table at the source section and at the target section after the transfer of the copy.

* * * * *